April 13, 1948. R. W. CANFIELD ET AL 2,439,716
PROCESS OF FORMING HOLLOW ARTICLES FROM ORIENTED POLYMER
Filed Jan. 27, 1944 3 Sheets-Sheet 1
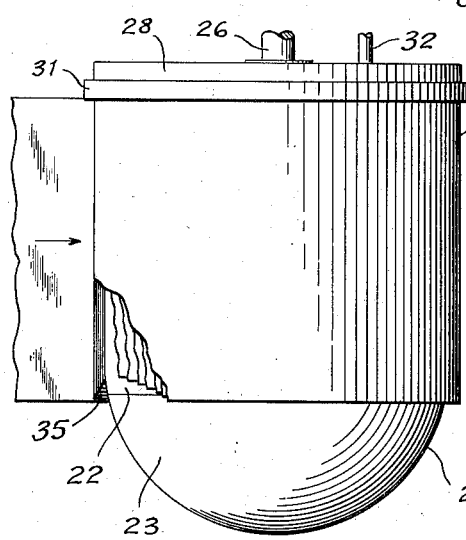
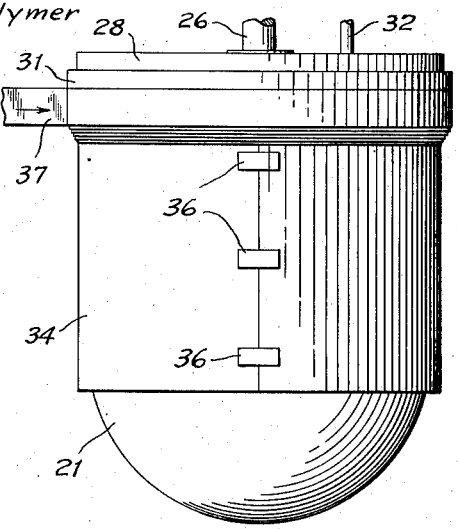
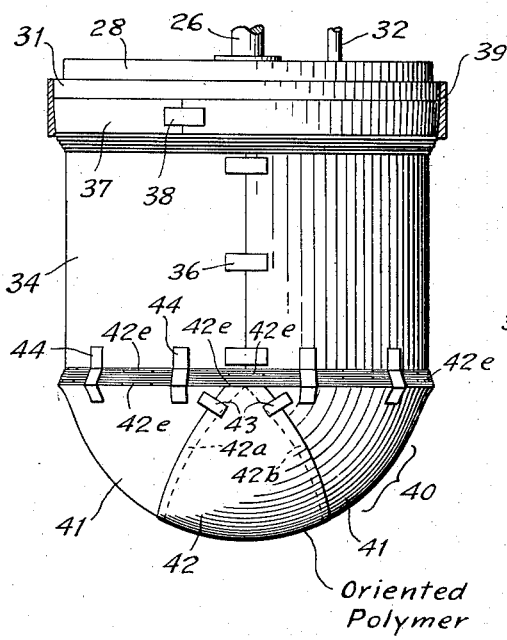
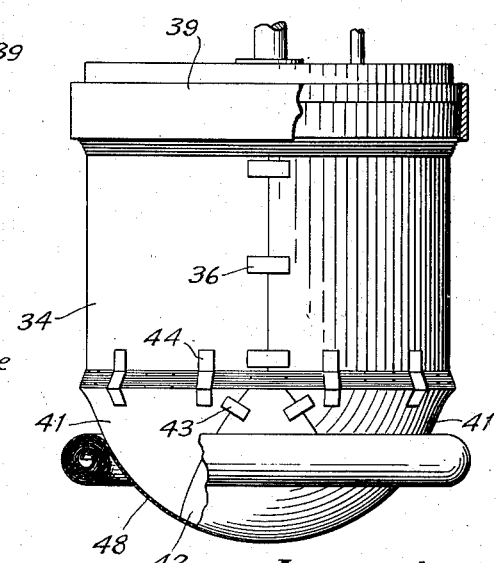
Inventors:
Robert W. Canfield
Fred E. Wiley and
Antone M. Guerreiro
by Brown & Graham
Attorneys.

April 13, 1948.      R. W. CANFIELD ET AL      2,439,716
PROCESS OF FORMING HOLLOW ARTICLES FROM ORIENTED POLYMER
Filed Jan. 27, 1944      3 Sheets-Sheet 2

Non-Lamellar Oriented Polymer

Witness:
A. A. Horn

Inventors:
Robert W. Canfield
Fred E. Wiley and
Antone M. Guerreiro
by Brown & Parham
Attorneys.

April 13, 1948. R. W. CANFIELD ET AL 2,439,716
PROCESS OF FORMING HOLLOW ARTICLES FROM ORIENTED POLYMER
Filed Jan. 27, 1944    3 Sheets-Sheet 3

Witness:
A. A. Horn

Inventors:
Robert W. Canfield
Fred E. Wiley and
Antone M. Guerreiro
by Brown Parham
Attorneys.

Patented Apr. 13, 1948

2,439,716

UNITED STATES PATENT OFFICE 2,439,716

PROCESS OF FORMING HOLLOW ARTICLES FROM ORIENTED POLYMER

Robert W. Canfield and Fred E. Wiley, West Hartford, and Antone M. Guerreiro, Hartford, Conn., assignors to Plax Corporation, Hartford, Conn., a corporation of Delaware Application January 27, 1944, Serial No. 519,890

2 Claims. (Cl. 18—59)

1

This invention relates to a process of forming rigid shapes of oriented resin polymer and to a method of making such shapes. It has particular relation to relatively large shapes of relatively high strength formed from certain resin polymers which produce brittle and hence relatively weak rigid shapes when molded by the usual injection or compression methods. The resin polymers referred to are of the type which are capable of molecular orientation, such as vinyl polymers, of which polystyrene is an example.

Such resin polymers have certain valuable properties which make their use desirable and therefore if their inherent brittleness or weakness is overcome, the use of the polymers can be substantially increased.

It is known that the tensile strength and toughness of such polymers may be substantially increased by molecular orientation of thin sections such as fibers and foils. Thus, polystyrene, though forming a brittle foil or sheet when formed by ordinary methods, may be toughened and made flexible by molecular orientation. One method of doing this is to extrude the polymer in the form of a sheet or ribbon and then to stretch it in both transverse and longitudinal directions at selected rates under selected temperature conditions to effect molecular orientation. The area of the sheet is increased and its thickness reduced. The method of forming such sheet is not per se part of the present invention. Sheet or foil which is molecularly oriented by both transverse and longitudinal stretching is referred to herein as "biaxially oriented."

However, it is not feasible in most cases to strengthen or toughen rigid shapes or articles of unusual shape or size after they have been formed by any such method of molecular orientation because of the difficulty of establishing and controlling the necessary conditions and of stretching such articles at the required rate and to the required degree. Therefore, such articles usually have had to be formed by heating molding powder until soft and flowable and forming it in a mold by compression or injection molding with the result that the articles have the inherent brittleness and possibly other defects of the resin polymer which may cause them to crack or break in service.

Furthermore, it is very difficult and in some cases impossible to form hollow shapes having relatively thin walls from resin polymers by injection or compression methods because of the high resistance of flow of such polymers through narrow spaces. This is particularly true with regard to relatively large, thin walled articles having an end portion connected to the side wall of the articles. In addition, relatively expensive dies comprising both male and female portions, and costly machinery, are required in producing such articles by compression or injection molding.

The general object of this invention is to produce rigid, integral shapes, including hollow shapes, of highly oriented polymer and which articles therefore are relatively strong.

Another object is to produce rigid integral hollow shapes of oriented resin polymer having a side wall portion and an end portion connected to the side wall portion.

A more specific object is to produce rigid integral hollow shapes of oriented resin polymer for use as electrical insulation or the like. Such articles may take the form of domes, covers or casings for electronic apparatus, supersonic apparatus, or for similar purposes.

Still another object is to produce relatively thin-walled rigid integral shapes of oriented polymer.

It also is an object of the invention to provide a novel process of forming shapes of the character referred to above from sheet or foils of the desired polymer, which sheet or foils have been molecularly oriented. This is accomplished by coalescing the sheet or foils by heat into a solid, continuous or integral and non-lamellar mass of the desired shape in which the identity of the sheet or foils is lost, or nearly lost, but under controlled conditions such that a substantial amount of the molecular orientation thereof is retained in the hollow shape. Preferably, the process is so performed that substantially all of the molecular orientation of the sheet or foil is retained in the final articles.

The present invention is particularly distinguished from prior processes and articles in that recovery forces are established in the oriented sheet by heating the sheet until elasticity develops and utilizing these forces, preferably in conjunction with low pressure, to effect the desired coalescence of the sheets into the integral non-lamellar mass. These recovery forces are due to the tendency of the oriented sheet to resume or recover the shape and dimensions which it had before stretching and orientation, that is, the tendency to contract in the plane of the sheet and to increase in thickness. Substantial loss of orientation is prevented by restraining the contraction and thickening of the sheet and limiting the temperature and time of heating so as to prevent substantial relaxation of molecular orientation which can occur without contraction and thickening. Also the duration of recovery forces is limited by limiting the time of heating so as to prevent rupture of the sheet.

From the foregoing, it will be apparent that the articles produced by this invention contain potentially high recovery forces which make them unstable to heat. However, the articles can be used for a great many purposes in which they are not heated sufficiently to establish or release the recovery forces.

Other objects and advantages of the invention will be pointed out in the following specification or will become apparent therefrom, or from the accompanying drawings, which depict various embodiments of the invention and in which drawings:

Figs. 1 to 6 inclusive show successive steps in the novel method for producing a rigid non-lamellar dome of oriented polymer from molecular oriented sheet of such polymer;

It will be understood that variations and changes may be made as to the types or shapes of articles produced, and as to the manner in which the method is performed, without departing from the scope of the appended claims.

The invention will be described in its application to the production of hollow shapes of polystyrene, an inherently brittle resin polymer having valuable properties, such as a low power factor, which makes it especially useful in electronics. Other resin polymers capable of being molecularly oriented may be employed. The polystyrene is employed in the form of flexible sheet or foil which has been molecularly oriented, preferably by stretching the sheet transversely and longitudinally. Thus, the sheet or foil may be oriented by increasing its area by a factor of 12 by transverse and longitudinal stretching under conditions controlled to provide sheet or foil having a high degree of orientation. However, in some cases or for some portions of the article to be produced, the sheet may be relatively stiff rather than flexible and also may be especially shaped or preformed to a desired shape or curvature approximating that portion of the article which is thereby to be constituted.

Figure 5:
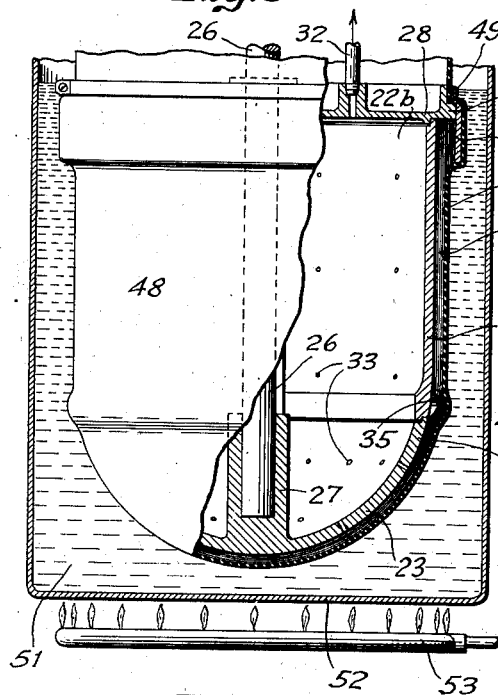
Figure 6:
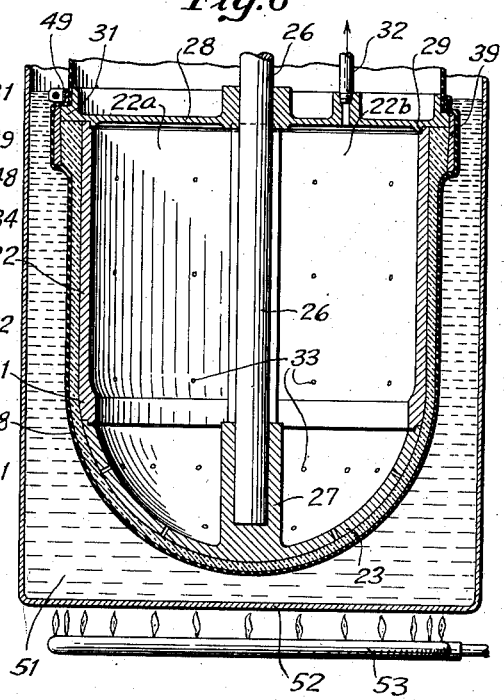
Figure 7:
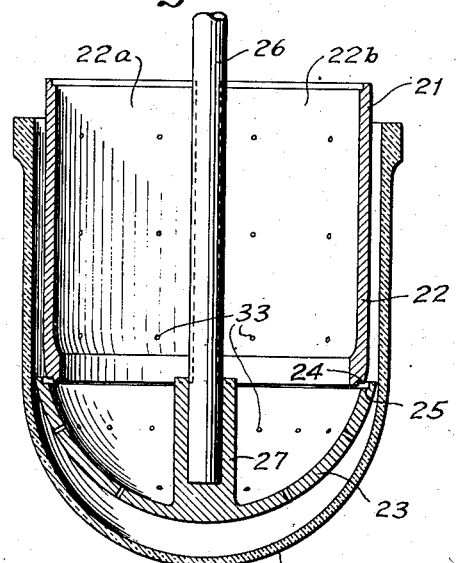
Fig. 7 is a view showing the dome formed by the steps of Figs. 1 to 6 being removed from a form.

As illustrated in Figs. 1 to 7, the hollow article is formed by assembling layers of the oriented resin polymer upon a mandrel or form 21 which first will be described with particular reference to Figs. 6 and 7. The mandrel 21 comprises a cylindrical portion 22 for forming the side wall of the dome and a semispherical portion 23 for forming the end portion of the dome. The cylindrical portion 22 may be made in four or more sections, two of which are shown at 22a and 22b, Fig. 6, so that the the cylindrical portion 22 of the mandrel or form can be collapsed inwardly. The sections of the cylindrical portion of the form or mandrel are, in general, arranged to fit together and are held together for shaping operations and in a manner and by means, the details of which are not illustrated, because well known in the molding art. It is sufficient to explain that after the molding operation the sections of the portion 22 are moved inwardly, as shown in Fig. 7, to free the article for removal.

The bottom ends of the sections 22a—22b are chamfered at 24, Fig. 7, as also is the upper edge of the member 23 as indicated at 25, so that these parts may fit together, as shown in Fig. 6, and may be separated as shown in Fig. 7 by moving the sections inwardly.

The sections 22a, 22b of the portion 22 rest upon the member 23 and the mandrel thus formed is supported or suspended by means of a central shaft 26, the lower end of which is suitably secured in the central lug 27 which rises from the interior of the member 23.

The form 21 is provided with a cover 28, Figs. 5 and 6, chamfered to fit the upper edges of the sections 22a—22b, as shown at 29, and projecting outwardly to provide a forming flange 31. The cover 28 is connected to a suitable source of vacuum, not shown, through a pipe 32 and the sections 22a and 22b and the mandrel portion 23 have numerous holes 33 therein for applying the vacuum to the exterior of the mandrel for the purposes described below. Other members or parts associated with the mandrel or form will be described hereinafter.

Figure 8:
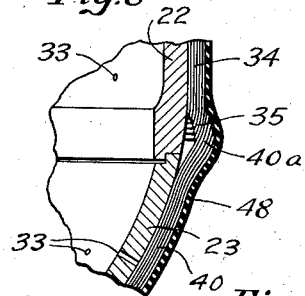
Figs. 8 and 9 are enlarged detailed views showing a preferred way of arranging and connecting separate assemblies of sheet and the structure thereby obtained.

In performing the novel process, a sheet of oriented polymer may be wound on the mandrel or form 21 with its upper edge against the underside of the flange 31 until the desired number of layers are in place. (See Fig. 1.) The cylindrical winding thus formed is indicated at 34, Figs. 2 to 5. Preferably the sheet is made of or cut to slightly and gradually increasing width from its inner end to its outer end so that the layers wound on the mandrel are of outwardly increasing width and thus form an outwardly tapered bottom edge portion at 35, Figs. 1, 5, and 8.

The assembly of layers thus provided has an approximate shape and size of the side wall portion of the dome to be formed and when the winding has been completed, the outer free end may be held in place temporarily by tapes, as shown at 36, Figs. 2, 3 and 4, to prevent unwinding.

A flange may be formed on the dome by winding a narrow strip 37 of oriented resin polymer over the winding 34 and against the underside of flange 31 until the thickness of the layers is sufficient to form the flange to the desired radial thickness. The end of this winding also may be held in place temporarily by a tape, as indicated at 38, Fig. 3. However, this tape may be removed and the winding of the ribbon 37 held in place by means of a steel ring 39 which has a tight sliding fit over the outer edge of the cover 28 and which in addition to holding winding 37 in place assists in forming the flange, as explained below.

Figures 5A, 9:
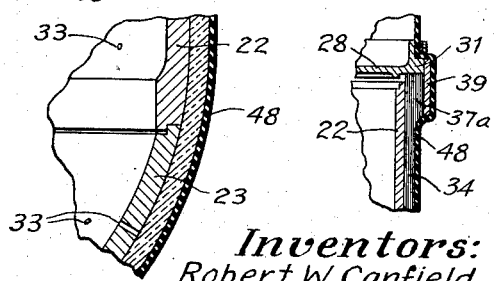

The formation of a flange on the dome may be assisted by employing a ribbon 37a, Fig. 5a, of greater width than the length of the flange to be formed and so located that the cover 28 will be supported by the winding 37a in spaced relation to form 22 as shown in Fig. 5a. The application of vacuum and heat, as explained below, will permit seating of cover 28 and the formation of a solid flange even though the winding may initially contain as much as 30% air by volume in the flange forming space.

To form the semispherical end of the dome, suitably preformed, molecularly oriented sheet is assembled in the desired number of layers over the end portion 23 of the form or mandrel 21 and in overlapping relation to the bottom edge portion of the cylindrical winding to provide a semispherical assembly of layers as indicated generally at 40, Fig. 3. These preformed members may have various shapes. As illustrated in Figs. 3, 4 and 5, they are made of sections of a semisphere, there being a number of sets or groups comprising three sections each. Two of these sections, shown at 41 of Figs. 3 and 4, have the form illustrated in Fig. 11. They may be placed on the member 23 with their respective pointed ends 41a touching and the third section 42 is then placed in position so that its edges overlap the inner edges of the sections 41, as indicated at 42a and 42b, Fig. 3. The form of the section 42 is shown in Fig. 10 from which it will be seen that it is provided with tabs 42c and 42d by means of which the section 42 is drawn tightly into position on the form but which may be cut off, as shown at 42e, in line with the upper edges of the sections 41 of the same group or set.

The sets of sections preferably are applied to the form successively in staggered relation so that the overlaps 42a and 42b are angularly spaced about the axis of the dome, as indicated by the cut ends 42e, Figs. 3 and 4, of the section 42 of the respective sets of sections. This avoids unduly and locally thickening the end of the dome by the overlaps 42a and 42b.

The sections 41 and 42 may be held together temporarily by tapes 43 and the sets of sections may be held in assembled relation with the cylindrical winding by tapes 44.

Figure 12:
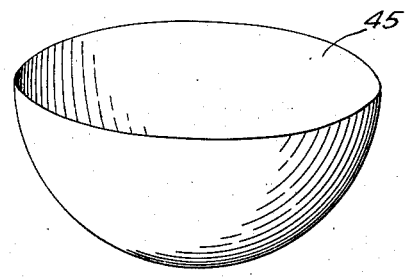
Figs. 12 and 13 show other preformed shapes of oriented polymer which may be employed to form the end of a dome.
Figure 11:
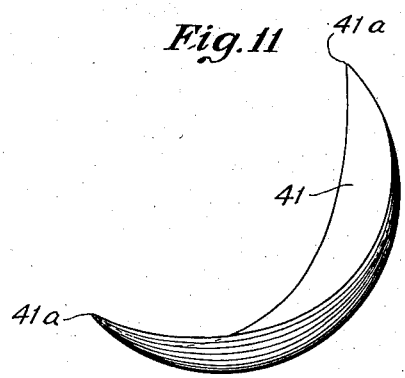
Figs. 10 and 11 are views of preformed curved segments of oriented resin polymer which may be employed to form the end portion of the dome as illustrated in Figs. 3 and 4.
Figure 10:
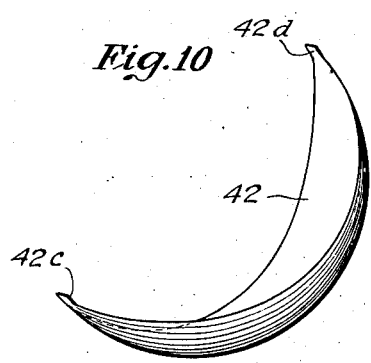

Instead of employing the sections 41 and 42 of Figs. 10 and 11, integral semispherical preforms of oriented polymer may be used, such as shown at 45, Fig. 12.

The preformed elements, such as those of Figs. 10, 11 and 12, which are spherically curved may be formed by heating a sheet of the polymer and forming it to the desired shape by means of a male drawing die or by blowing it with or without the aid of a female die, or the heated sheet may be shaped by drawing it into a female die by means of a vacuum. Such dies are old in the art and hence are not shown in the drawings. The sheet may be heated by air or by steam. Sheet which has been previously molecularly oriented may be employed and if such sheet is used the time of heating is made very short or the sheet is heated to a relatively low temperature, to prevent as much as possible loss of orientation, while permitting the sheet to be softened sufficiently for the shaping operation. By a proper control of temperature, time of heating and rapidity of the forming operation, orientation of the sheet may be increased to a degree higher than that initially in the sheet, or if the sheet is initially unoriented a desirably high degree of orientation may be obtained.

In shaping elements having a double curvature, such as those of Figs. 10, 11 and 12, the forming operation may be performed in two steps, by first bending the sheet to one curvature and then blowing or drawing the sheet to another curvature. The sheet may be held by means of suitable clamps (not shown) in forming it by any of the above methods.

Figure 13:
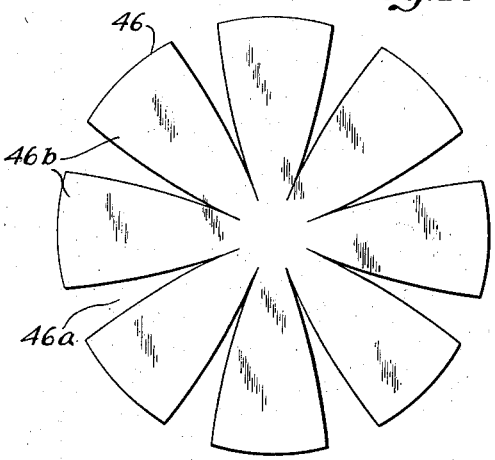

The curved end of the dome also may be provided for by the use of a number of preforms of the type shown at 46 in Fig. 13. Preform 46 is circular and flat and is cut out, as indicated at 46a, to provide a number of centrally connected sections 46b of such shape and size that the preform can be brought into approximately semispherical shape by overlapping the edges of these sections. As in the use of the elements 41 and 42 in Figs. 3 and 4, the preforms 46 may be so arranged that the overlaps thereof are staggered.

Referring again to Figs. 3, 4 and 5, it will be seen that the semispherical assembly 40 is made up of elements which are of outwardly diminishing depth, or inwardly increasing depth. This is more clearly shown in Fig. 8 from which it may be seen that an inwardly tapered upper edge portion is provided at 40a which overlaps the tapered edge portions 35 of winding 34.

This method of forming and overlapping the assemblies 34 and 40 is preferred because it avoids internal edges which are objectionable because, unless a high external pressure is employed in the forming operation or the edges are tapered, voids are formed between such internal edges and the material on opposite sides of such edges. Thus, it will be seen from Fig. 8 that all the edges of tapered portion 40a are external to the outer surface of the assemblies and all of the edges of the tapered portion 35 are external to the inner surface of the assemblies. No edge is overlapped by two layers and hence no voids can be formed where the connection is made between the two assemblies. In addition, the tapered portions form a wall of substantially uniform thickness and of the same thickness as the adjacent wall portions as indicated in Fig. 9.

Where voids are not objectionable, the layers where the assemblies are to be connected may be overlapped so as to leave internal edges.

The entire assembly of oriented polymer may now be covered by a flexible, liquid-proof bag 48 of rubber or other suitable material and this may best be done by first rolling up the bag, applying it to the bottom end of the assembly and unrolling it up and over the assembly, the various tapes applied to hold the layers in place preferably being removed as the bag is unrolled. The bag preferably is of sufficient length to cover the ring 39 and to extend upwardly therefrom so that it may be securely clamped on the cover 28 by means of a clamping ring 49, Figs. 5 and 6. A vacuum is applied to the assembly through connection 32 and perforations 33 whereby all air is exhausted from between the layers of sheet and an outside pressure is created on the bag 48 to hold the sheet in place and assist in the forming operation. The assembly is now ready for heating to form the hollow article.

Heating preferably is conducted by immersing the assembly in a suitable heating bath, such as shown at 51, in a container 52 heated by a burner 53. A suitable heat transfer liquid is ethylene glycol.

The assembly is heated in the bath at a temperature for a period selected to establish recovery forces in the oriented sheet. Such heating softens the sheet sufficiently to permit the recovery forces or stresses, augmented by the external pressure on the bag 48, to cause the layers of sheet to coalesce into an integral non-lamellar mass. This probably occurs in about 20 minutes after a uniform temperature has been established and the inner layers have reached the temperature of high elasticity at which recovery forces or stresses are developed in the sheet. The temperature and time of heating preferably are so selected and limited and the recovery forces so limited, held or restrained that actual recovery is very slight, rupture of the sheet and separation of overlaps are avoided, and relaxation of molecular orientation does not occur or is not substantial. Although a temperature of heating is used which is high enough for relaxation to occur, the time of heating at such temperature is insufficient to permit substantial relaxation of orientation. Consequently the molecular orientation of the layers is preserved and remains in the final article, imparting high strength thereto.

The temperature and time of heating may be varied according to the maximum thickness of the assembly; the greater the thickness, the greater the minimum amount of heating necessary. The time of heating is varied inversely as the temperature.

The temperature of heating must be above the transition temperature of the polymer, this being 180° F. in the case of polystyrene having a molecular weight of about 75,000. The transition temperature here referred to is determined by the method disclosed in "Transition temperature and cubical expansion of plastic materials," by Fred E. Wiley, Industrial and Engineering Chemistry, vol. 34, page 1052, September 1942. The heating temperature should be substantially above the transition temperature to speed up the forming operation. The heating may be performed with a heating bath maintained at 220–280° F.

For the production of a dome, such as shown in Figs. 1 to 7, of approximately 26 inches in diameter, approximately 31 inches long and having a wall approximately .060 of an inch thick and a flange ¼" thick from biaxially oriented (transversely and longitdinally stretched) polystyrene sheet of .005 to .010 inch thick, the assembly may be held in the bath at 245° F. for 3 hours, or at 265° F. for 2 hours, with good results.

Recovery of the layers is restrained so as to prevent separation thereof where they overlap by the application of holding pressure. Thus, the application of vacuum to the interior of the form creates a differential pressure which is effective on the bag 48 and the exterior of the assembly to restrain recovery of the layers and to assist in the forming operation. In addition, the internal vacuum assists in removing air from between the layers which also is squeezed out by the recovery forces.

Also, holding and forming pressure is developed by ring 39 due to the slight thickening of the layers of winding 37 as they contract and coalesce into a solid mass which causes recovery forces to build up in the layers between ring 39 and the upper end of form 21. In this case the holding pressure is a pressure of reaction. It will be apparent that the ring 39 restrains recovery of the layers between it and the form 21.

It is probable that slight softening of the layers takes place and causes them to stick together before they can contract and separate as the result of the development of the recovery forces.

If desired the top of chamber 52 may be closed and positive pressure applied through the liquid bath to bag 48 and the layers of the assembly to provide holding and forming pressure in lieu of or to augment that resulting from internal vacuum.

Figure 14:
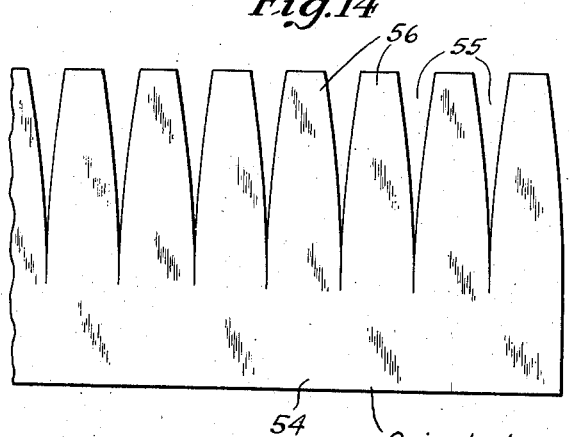
Fig. 14 shows a preformed sheet of oriented polymer for the production of a different form of dome illustrated in Fig. 15.
Figure 15:
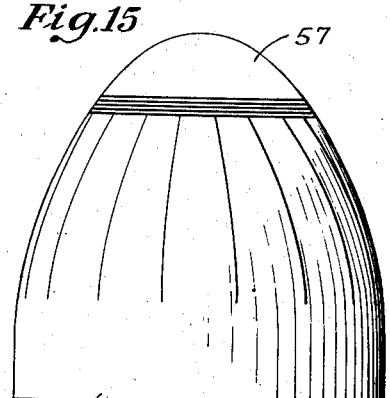

Various hollow shapes, other than cylindrical shapes with semispherical ends, may be made embodying and in accordance with this invention. Thus, a hollow shape of parabolic form, such as shown in Fig. 15, may be made. To make such a shape, a sheet 54 of oriented polymer, Fig. 14, may be cut out as shown at 55 to provide tapered strips 56 thereon. This sheet may then be wound on a suitable form and strips 56 held thereon in overlapping relation against the form and against the inner layers of the sheet. The end of the article may be formed of preshaped elements 57 of oriented polymer assembled with the winding of sheet 54 as shown in Fig. 15. The entire assembly may then be formed into a rigid non-lamellar article of oriented polymer as described above.

From the foregoing it will be seen that rigid, integral, non-lamellar articles of oriented polymer may be formed of substantially greater strength than can be formed by ordinary molding methods thus overcoming the inherent brittleness of articles produced by such methods. At the same time high mold costs and other disadvantages of prior methods are avoided particularly in the production of unusually large shapes or hollow shapes.

The articles produced by this invention can be distinguished from articles produced by other methods, by tests which reveal the high strength or toughness of these products and the arrangement of molecular orientation which generally corresponds in pattern and degree to that of the assembled sheet or foil from which the articles are made. They also may be distinguished by marks, lines or edges which may remain on the surface of the article as the result of slight, uneven contraction of the layers or of partial overlapping of the layers even though the structure of the article is non-lamellar.

Having thus described our invention, what we desire to claim and secure by Letters Patent is:

1. The process of forming an integral hollow article of oriented polymer having a wall portion and a curved end portion which comprises assembling on a form layers of oriented polymer for the wall portion of the article, then assembling on the form curved layers of oriented polymer for the end portion of the article in overlapping relation to the first-named layers, heating the entire assembly until the layers are coalesced into an integral mass, and restraining the recovery of the layers during such heating to prevent separation of the wall forming layers and the end forming layers.

2. The process of forming an integral hollow article of oriented polymer having a wall portion and an end portion which comprises assembling on a form layers of biaxially oriented polymer for the wall portion of the article, then assembling on the form hollow layers of oriented polymer for the end portion of said article in overlapping relation to the first-named layers, covering the entire assembly with a flexible bag, immersing the assembly in a liquid heating bath, holding the assembly in the bath only long enough to cause the layers to coalesce into an integral mass of oriented polymer, and maintaining a differential pressure between the interior of said layers and the exterior of said bag during the heating of said assembly.

ROBERT W. CANFIELD.
FRED E. WILEY.
ANTONE M. GUERREIRO.

REFERENCES CITED

The following references are of record in the file of this patent:

UNITED STATES PATENTS

| Number | Name | Date |
|---|---|---|
| 460,086 | Harvey | Sept. 22, 1891 |
| 1,727,483 | Mozzelt | Sept. 10, 1929 |
| 1,914,273 | Meurling | June 13, 1933 |
| 1,930,995 | Carroll | Oct. 17, 1933 |
| 2,014,010 | Wheatley | Sept. 10, 1935 |
| 2,054,864 | Owen | Sept. 22, 1936 |
| 2,067,025 | Schmidt | Jan. 5, 1937 |
| 2,074,285 | Studt et al. | Mar. 16, 1937 |
| 2,114,625 | Bergstein | Apr. 19, 1938 |
| 2,236,552 | Ushakoff | Apr. 1, 1941 |
| 2,307,817 | Austin | Jan. 12, 1943 |
| 2,309,865 | Reach | Feb. 2, 1943 |
| 2,345,112 | Grundel | Mar. 28, 1944 |
| 2,362,672 | Sloan | Nov. 14, 1944 |
| 2,372,177 | Conner | Mar. 27, 1945 |

FOREIGN PATENTS

| Number | Country | Date |
|---|---|---|
| 440,776 | Great Britain | Jan. 6, 1936 |